United States Patent [19]

Auborn et al.

[11] 4,357,399
[45] Nov. 2, 1982

[54] ALKALI METAL-SULFUR CELLS

[75] Inventors: James J. Auborn, Warren; Shelie M. Granstaff, Jr., Summit, both of N.J.

[73] Assignee: Bell Telephone Laboratories, Incorporated, Murray Hill, N.J.

[21] Appl. No.: 314,385

[22] Filed: Oct. 23, 1981

Related U.S. Application Data

[63] Continuation of Ser. No. 100,388, Dec. 5, 1979, abandoned.

[51] Int. Cl.³ ............................................ H01M 4/36
[52] U.S. Cl. .................................. 429/104; 429/191; 429/218
[58] Field of Search ....................... 429/104, 218, 191

[56] References Cited

U.S. PATENT DOCUMENTS 4,063,005 12/1977 Mamantov et al. ............ 429/104 X
4,064,325 12/1977 Grenness ............................ 429/104

*Primary Examiner*—Charles F. LeFevour
*Attorney, Agent, or Firm*—Richard D. Laumann

[57] ABSTRACT

An alkali metal, such as sodium, sulfur cell having an alkali metal anode, a solid ionic electrolyte, such as sodium $\beta$ alumina, and a liquid catholyte formed by sulfur, a halosulfane, such as sulfur monochloride and a haloacid, such as aluminum chloride, is described.

8 Claims, 3 Drawing Figures

ALKALI METAL-SULFUR CELLS

This application is a continuation of application Ser. No. 100,388 filed Dec. 5, 1979, now abandoned.

TECHNICAL FIELD

This invention is concerned with alkali metal-sulfur cells.

BACKGROUND OF THE INVENTION

There has been considerable interest in recent years in advanced technology storage cells because of their potentially high energy densities per unit weight and volume. Potential applications of such cells include sources for standby power, utility load leveling, solar photovoltaic storage and vehicle propulsion. These applications may be complementary. For example, electric vehicles propelled by storage cells may contribute to utility load leveling because the storage cells can be recharged at night when utilities presently have excess generating capacity. The traditional and widely used lead-acid battery does not appear at present to be suitable for these applications. It is not practical for utility load leveling because it is unable to sustain the large number of deep discharge cycles desired, if not required, for such use. The relatively low ratio of energy density to weight, approximately 20 watt-hours/kilogram, limits, even if it does not preclude, the utility of such cells for vehicle propulsion.

Several systems have been examined as candidates for advanced technology storage cells. The systems examined have used many different materials for the electrodes and the electrolyte. One system that has been extensively investigated uses an alkali metal-sulfur couple for the electrodes. The alkali metal is typically lithium or sodium. Other alkali metals might be used, but their higher atomic weights will lower the theoretically attainable energy densities. These couples are attractive electrode candidates because of their high theoretical specific energies which are 2600 and 750 watt-hours/kilogram for the lithium-sulfur and sodium-sulfur couples, respectively.

The basic configuration of the sodium-sulfur cell has a molten metallic sodium anode, a molten sulfur cathode and a sodium ion conducting electrolyte separating the anode and cathode. In this configuration, the cell operates at a relatively high temperature. The high operating temperature, typically between 300 and 400 degrees C., is required to keep the anode and cathode materials, as well as the cathode reaction products, such as sodium polysulfides, molten. As might be expected, the high operating temperature causes complexities and problems. For example, an external power source and thermal insulation are required to keep the reactants molten. Further, both sulfur and sodium polysulfides are highly corrosive at high temperatures, and well-engineered cells require exotic structural and seal materials for safe operation. Lithium-sulfur cells have the same basic configuration as the sodium-sulfur cells.

To avoid these and other problems, much development activity has been directed toward reducing the operating temperature reange of sodium-sulfur or lithium-sulfur cells while retaining as many of the desirable attributes of the high temperature configuration as possible. However, several considerations limit the extent to which the operating temperature of sodium-sulfur cells may be lowered, and the minimum useful operating temperature for such cells is approximately 100 degrees C. This minimum is imposed by two practical considerations. Metallic sodium is not molten below 98 degrees C., and the conductivity of typical sodium ion conducting solid electrolytes is generally too low below this temperature for useful cells for the applications mentioned above.

The development activity directed toward reducing the operating temperatures of sodium-sulfur cells has involved several approaches. One approach uses catholytes in which organic solvents dissolve sulfur in cells having solid electrolytes. This approach appears to produce practical cells in the temperature range between 100 and 200 degrees C. However, the catholytes in these systems presently suffer the drawbacks of marginal solubilities for the reactants, excessive polarization and poor reversibility. These drawbacks limit capacity, rates and cycle life, respectively. Although these cells do operate at lower temperatures, their characteristics do not enable them to compete favorably with the high temperature sodium-sulfur cells at the present time.

Another approach has used cathodes in which the reactants are dissolved in molten salts. For example, one system uses cathode reactants dissolved in sodium chloride-aluminum chloride molten salts with sodium ion conducting solid electrolytes and liquid sodium anodes to construct cells operating between 175 degrees C. and 300 degrees C. However, sulfur is not very soluble in sodium tetrachloroaluminate melts. Consequently, the practical utility of this system as a battery cathode is limited. Another system using this approach is described in U.S. Pat. No. 4,063,005, issued on Dec. 13, 1977, to Gleb Mamantov and Roberto Marassi. Tetravalent sulfur is the active cathode material, and it is used in a molten chloroaluminate solvent formed by a mixture of $AlCl_3$ and NaCl having molar ratios greater than 1:1 and less than 4:1. The tetravalent sulfur is contained in the compound $SCl_3:AlClHd\ 4$, and it is reversibly reduced to elemental sulfur and sodium chloride in the acidic molten salt solvent as the elemental sodium is oxidized on the other side of a sodium ion conducting solid electrolyte. Typical cell operating temperatures are approximately 200 degrees C.

SUMMARY OF THE INVENTION

We have found that an alkali metal-sulfur storage cell having a liquid alkali metal anode, a solid alkali metal ion conducting electrolyte and active cathode reactants consisting of salts dissolved or complexed with inorganic liquid solvents may be constructed. If necessary, the ionic conductivity of the inorganic liquid is increased by dissolving inorganic salts. The active cathode reactants or catholyte consist of a halosulfane, a Lewis haloacid and molten sulfur, $(S_8)$. In a preferred embodiment, the alkali metal is sodium. The halosulfane is sulfur monochloride $(S_2Cl_2)$, and the Lewis haloacid is aluminum chloride $(AlCl_3)$. The molar ratio of sulfur monochloride to aluminum chloride in the catholyte is initially between 2:1 and 1:2. The molar fraction of sulfur in the catholyte is greater than or equal to 0 percent and less than approximately 75 percent. In a particular preferred embodiment, the catholyte consists of aluminum chloride and sulfur monochloride with the molar ratio initially being between 2:1 and 1:2.

DETAILED DESCRIPTION

Figure 1:
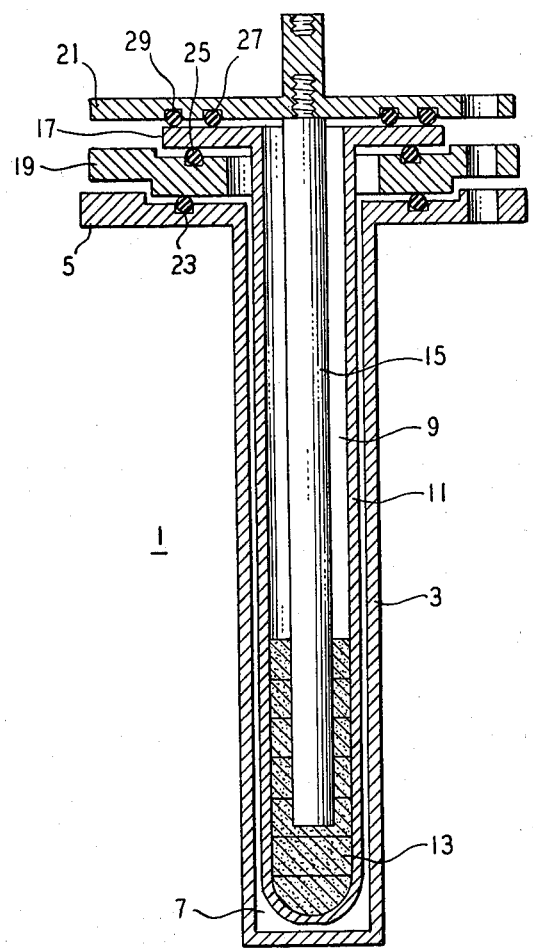
FIG. 1 is a sectional view of a cell made according to this invention.

FIG. 1 is a sectional view of an alkali metal-sulfur cell, shown generally as 1, of this invention. A container 3 having a flange 5 provides a chamber 7 for the alkali metal anode. The cathode mixture 9 or catholyte is contained inside tube 11 which is positioned within container 3. Tube 11 is ionically conductive and is conveniently made from an alkali metal ion conducting material such as sodium $\beta$ alumina. Tube 11 also separates the anode and cathode. Within tube 11 are a current collector 13 and an electrode 15. The alkali metal anode is between tube 11 and container 3. The cell is sealed with a header 17 and flanges 19 and 21. Between flanges 5 and 19 are O-rings 23 and 25. Between flanges 19 and 21 are O-rings 27 and 29. External electrical contacts (not shown) are made to electrode 15 and the alkali metal anode by well-known and conventional techniques. The cell is surrounded by a heating element (not shown) and insulating material, (not shown), which are conventional and maintain the cell at the desired temperature. The cells are desirably operated at temperatures of at least 140 degrees C. This temperature need only be high enough to maintain the alkali metal and catholyte in the liquid state.

Container 3 is conveniently made of stainless steel. Current collector 13 is made from graphite felt, and electrode 15 is typically made of stainless steel. Although the dimensions are not critical, tube 11 typically has a wall thickness between 1 mm and 2 mm, and a resistivity of approximately 5 ohm-cm at 300 degrees C. Header 17 may be made of $\alpha$ alumina. Flanges 19 and 21 may be made of stainless steel.

The alkali metal anode will typically have a liquid metallic alkali metal. However, the anode may also have the alkali metal present in a solution of, for example, cesium, gallium, indium or mercury. In a preferred embodiment, the alkali metal is sodium, although potassium and lithium can also be used. Sodium is preferred because of the stable and ionically conducting solid electrolytes known for sodium.

The catholyte consists of salts dissolved or complexed with inorganic solvents. The active reactants are a halosulfane, a Lewis haloacid and molten sulfur. A Lewis acid is an electron pair acceptor. A haloacid is a compound capable of serving as a halide ion acceptor in solution.

The halosulfanes have the atom formula $X_2S_n$, where X is a halogen selected from Group VII of the periodic table, and n is greater than or equal to 1 and less than or equal to 8. In a preferred embodiment, X is Cl, and n is 2. This compound, $Cl_2S_2$, is commonly referred to as sulfur monochloride. Methods of preparing halosulfanes are well known to those working in the art. For example, exemplary methods of preparing dichlorosulfane are described in *Handbook of Preparative Inorganic Chemistry,* Volume 1, pp. 370–376, Academic Press, New York, 1963. The amount of sulfur in the catholyte is within the range extending from 0 mole percent to approximately 75 mole percent. The initial molar ratio of the halosulfane to the haloacid is within the range extending from 2:1 to 1:2.

Some of the sulfur-halosulfane mixtures are not electrically conductive and will not solubilize the sodium chloride that will form as chlorine is reduced. The electrical conductivity and solubility of sodium chloride are improved to acceptable levels by the haloacid in the melt. In a preferred embodiment, the haloacid is a chloroacid, e.g., aluminum chloride. The chloroacid forms an ionic compound with the sodium chloride discharge product.

Elemental sulfur melts at 120 degrees C. and is a mobile liquid until approximately 158 degress C. At this temperature, it becomes extremely viscous, and both the electrical conductivity and mass transfer decrease. This polymerization is prevented, when sulfur is present, by the presence of the halosulfane such as sulfur monochloride. The sulfur is solubilized by forming polysulfide-like chains that are capped by chlorine atoms. The sulfur need not be present in the catholyte, i.e., only a sulfur containing halosulfane need be present.

The starting materials, including the sodium $\beta$ alumina tubes, are commercially available. Assembly of the cell is by conventional and well-known techniques that need not be described in detail. Cells of this invention will be further described by reference to exemplary cells.

The hypothesized cell reactions will then be discussed.

EXAMPLE 1

Figure 2:
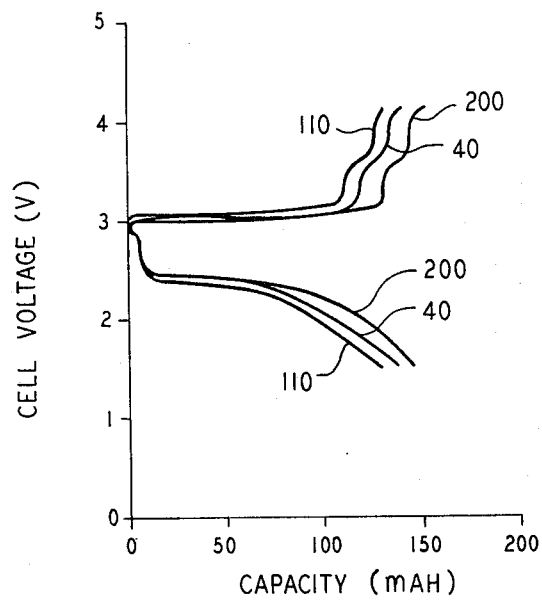
FIG. 2 plots cell voltage, vertically, versus cell capacity, horizontally, at a constant discharge current for a first cell of this invention.

The cell was fabricated with conventional structure and had a catholyte consisting of sulfur monochloride, aluminum chloride and sulfur having relative molar ratios of 1:0.65:4.56. The total mass was 2.35 gm. The anode was sodium and had a large excess of Na on the outside of the $\beta$ alumina tube. The cell operated at temperatures of approximately 155 degrees C., and a constant current of $1 mA/cm^2$. Typical charge and discharge curves are shown in FIG. 2 with the cell voltage, in volts, plotted vertically versus the cell capacity, in mAH, horizontally. The charge limit was 4.1 volts. The numbers are cycle numbers. The scale, especially for low capacity, is compressed, and some details are difficult to see. There are, however, three voltage plateaus at 3.65, 3.55 and 2.65 volts. There is also a minor voltage plateau at 1.5 volts.

EXAMPLE 2

Figure 3:
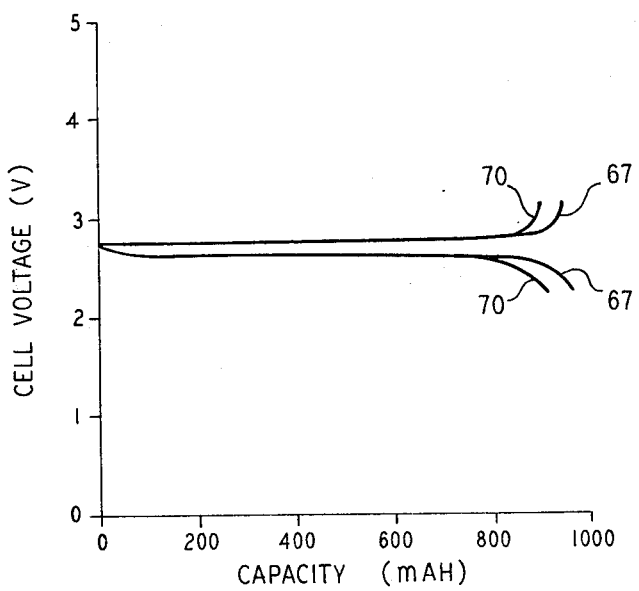
FIG. 3 plots cell voltage, vertically, versus cell capacity, horizontally, at a constant discharge current for a second cell of this invention.

A cell was fabricated as described with respect to FIG. 1 and had a catholyte consisting of sulfur monochloride and aluminum chloride. The molar ratio of these two constituents was 1:1.03, and the catholyte had a total mass of 7.73 gm. The anode was sodium. The cell was cycled at different constant currents and different voltage limits, as well as different temperatures. The initial open circuit voltage at 155 degrees C. was 4.21 volts. With a constant current density of 2.5 $mA/cm^2$ and voltage limits of 1.7 volts and 4.1 volts, the total capacity was approximately 2.16 amp-hours, and voltage plateaus were observed at 3.65, 3.55 and 2.65 volts. The cell was also cycled between the smaller voltage limits of 2.25 volts and 3.1 volts, i.e., on the lower plateau. FIG. 3 plots the cell voltage, vertically versus cell capacity in milliamp hours, mAH, horizontally for cycles on the lower plateau. For the cycles indicated (67 and 70), the temperature was 175 degrees C., and the current density was 2.5 $mA/cm^2$. In discharge 67, the cell had a capacity of approximately 970 mAH. For this cell, as for the cell of Example 1, the 2.7 volt plateau was extremely reversible.

It is hypothesized that the following are the cell reactions for the first cell. For the first plateau, i.e., the plateau at 3.65 volts, $Na + AlCl_3 + S_2Cl_2 \gtreqless [S] + \frac{1}{2}(S_2Cl_2) + NaAlCl_4$, is believed to be the reaction. The reaction at the 3.55 volt plateau is believed to be $Na + [S] + \frac{1}{2}(S_2Cl_2) + NaAlCl_4 \gtreqless [S] + NaCl + NaAlCl_4$ The reaction at the 2.7 volt plateau is believed to be $2Na + 2[S] + NaCl + NaAlCl_4 \gtreqless 2[S] + 3NaCl + NaAlSCl_2$ The cell reactions are similar for the cell of Example 2.

It is believed that the initial discharge, i.e., at 3.65 volts, removes most of the acid and leads to a basic melt which is less corrosive than the initial acidic melt.

Cells cycled on the 2.7 volt plateau have specific energies in excess of 200 WH/kgm on this plateau. Overcharge protection is provided by the 3.65 volt plateau, and overdischarge protection is provided by the 1.5 volt plateau.

We claim:

1. A cell comprising an alkali metal anode; a cathode, a solid ionic electrolyte, said electrolyte separating said anode and said cathode; characterized in that the active reactants of said cathode comprise halosulfanes and haloacids; said halosulfanes and said haloacids having molar ratios between 2:1 and 1:2, said active reactants forming a basic mixture for at least part of the charge/discharge cycle.

2. A cell as recited in claim 1 in which said alkali metal is sodium.

3. A storage cell as recited in claim 2 in which said electrolyte is sodium $\beta$ alumina.

4. A cell as recited in claim 2 in which said halosulfane has the atom formula $Cl_2S_n$, n greater than or equal to 1 and less than or equal to 8.

5. A cell as recited in claim 4 in which n equals 2.

6. A cell as recited in claim 5 in which said haloacid is chloroacid.

7. A cell as recited in claim 6 in which said chloroacid is aluminum chloride.

8. A cell as recited in claim 1 in which said active reactants of said cathode further comprise sulfur, said sulfur being present in an amount up to approximately 75 mole percent of said active reactants.

* * * * *

UNITED STATES PATENT AND TRADEMARK OFFICE
CERTIFICATE OF CORRECTION

PATENT NO. : 4,357,399
DATED : November 2, 1982
INVENTOR(S) : James J. Auborn and Shelie M. Granstaff, Jr.

It is certified that error appears in the above—identified patent and that said Letters Patent is hereby corrected as shown below:

Column 2, line 38, "$SCl_3:AlClHd\ 4$" should read --$SCl_3:AlCl_4$--. Column 4, line 63, "vertically" should read --vertically,--. Column 6, line 9, "claim 1" should read --claim 1 or 8--.

Signed and Sealed this

Eighth Day of February 1983

[SEAL]

Attest:

Attesting Officer

GERALD J. MOSSINGHOFF
Commissioner of Patents and Trademarks